(12) United States Patent
Patel et al.

(10) Patent No.: US 9,701,810 B2
(45) Date of Patent: Jul. 11, 2017

(54) LOW VOC SOLVENTBORNE DISPERSION COMPOSITIONS FOR TINTING SOLVENT-BASED COATINGS

(75) Inventors: Yamini Patel, Woodbridge, NJ (US); Steven Paul Riccardi, Somerset, NJ (US); Daniel Goldberg, Bordentown, NJ (US); Jadel Baptista, Jr., Somerset, NJ (US); Luc Driessen, Masstricht (NL)

(73) Assignee: Chromaflo Technologies Corporation, Ashtabula, OH (US)

( * ) Notice: Subject to any disclaimer, the term of this patent is extended or adjusted under 35 U.S.C. 154(b) by 459 days.

(21) Appl. No.: 13/640,835

(22) PCT Filed: Apr. 12, 2011

(86) PCT No.: PCT/US2011/032153
§ 371 (c)(1),
(2), (4) Date: Jun. 3, 2013

(87) PCT Pub. No.: WO2011/130299
PCT Pub. Date: Oct. 20, 2011

(65) Prior Publication Data
US 2013/0237656 A1 Sep. 12, 2013

Related U.S. Application Data

(60) Provisional application No. 61/342,352, filed on Apr. 12, 2010.

(51) Int. Cl.
| | |
|---|---|
| *C08K 5/10* | (2006.01) |
| *C08K 3/00* | (2006.01) |
| *C08K 5/101* | (2006.01) |
| *C09D 17/00* | (2006.01) |
| *C09B 67/08* | (2006.01) |
| *C09B 67/46* | (2006.01) |

(52) U.S. Cl.
CPC .............. *C08K 5/10* (2013.01); *C08K 3/0033* (2013.01); *C08K 5/101* (2013.01); *C09B 67/001* (2013.01); *C09B 67/009* (2013.01); *C09B 67/0013* (2013.01); *C09D 17/002* (2013.01); *C09D 17/003* (2013.01); *C09D 17/004* (2013.01)

(58) Field of Classification Search
CPC ....................................................... C08K 5/10
See application file for complete search history.

(56) References Cited

U.S. PATENT DOCUMENTS

| | | | |
|---|---|---|---|
| 6,235,104 B1 * | 5/2001 | Chattopadhyay et al. ... | 106/403 |
| 6,624,124 B2 * | 9/2003 | Garmier ........................ | 508/491 |
| 2002/0010298 A1 | 1/2002 | Takayanagi et al. | |
| 2004/0091541 A1 * | 5/2004 | Unger .................. | A61K 9/0009 424/486 |
| 2006/0207476 A1 | 9/2006 | Coward et al. | |
| 2008/0250976 A1 | 10/2008 | Behr | |
| 2009/0312463 A1 * | 12/2009 | Bernaerts et al. .............. | 524/89 |
| 2010/0004366 A1 * | 1/2010 | Engelbrecht et al. ......... | 524/320 |

OTHER PUBLICATIONS

Poly(methyl methacrylate) analytical standard, for GPC, 20,000; 81498; Sigma-Aldrich; 2015.*
Poly(methyl methacrylate) 81498 Safety Data Sheet; Sigma-Aldrich; Jun. 25, 2014.*

* cited by examiner

*Primary Examiner* — Michael Pepitone
(74) *Attorney, Agent, or Firm* — Benesch, Friedlander, Coplan & Aronoff, LLP

(57) ABSTRACT

A solventborne pigment dispersion having a volatile organic chemical (VOC) content that is less than 250 g/L for tinting solvent-based surface coatings is formulated using a vegetable oil-derived solvent component that is one or more methyl esters of vegetable oils, an acrylic resin containing at least 60% solids, one or more highly concentrated surfactants containing up to 100% by weight of active constituents and that contains no PMA or free aromatic moieties, and one or more organic pigments or one or more inorganic pigment, or a combination thereof.

11 Claims, No Drawings

LOW VOC SOLVENTBORNE DISPERSION COMPOSITIONS FOR TINTING SOLVENT-BASED COATINGS

CROSS REFERENCE TO RELATED APPLICATIONS

This application claims priority to International Application No. PCT/US2011/032153, filed Apr. 12, 2011, which claims priority to U.S. Provisional Patent Application No. 61/342,352, filed Apr. 12, 2010, both of which are incorporated herein by reference.

FIELD OF THE INVENTION

This invention relates to solventborne pigment dispersion compositions, or pigment dispersions, that contain a relatively low content of volatile organic chemicals (VOC) for use in preparing tinted solvent-based coatings. As used herein, the term "colorants," "colorant compositions" and "pigment dispersions" are intended to have the same meaning and may be used interchangeably.

BACKGROUND OF THE INVENTION

Various federal and state agencies in the United States, as well as European and other national regulating agencies have announced or established regulations requiring a reduction in the volatile organic chemicals (VOCs) released from surface coatings, or paints. In general, solvent-based surface coatings are eventually prepared for use by the addition of one or more pigment dispersions containing pigments and other additives in order to achieve the colors, hues and tints desired by the user. In some cases, the pigment dispersions, are added at the paint manufacturer's facility to a clear base or to an opaque base that contains titanium dioxide or some other white pigment to produce the finished paint, or a tinted precursor base. In many other instances, custom tinting occurs at the point of sale (POS), or at a depot, or in-plant at the paint manufacturing facility by addition of one or more pigment dispersions to a clear base or to an opaque base containing a white pigment.

Regulations concerning VOC content vary depending on the region or state in the US or the international jurisdictions. The most stringent limits were originally developed in California for architectural and industrial maintenance (AIM) coatings. In Europe, in an effort to combat ground level air pollution, the European Union Directive 2004/42/EC was promulgated to minimize, monitor and control the effects of VOCs.

Currently, in some jurisdictions, the VOC content of pigment dispersions is not included in the VOC calculation for point of sale, although it must be included for in-plant tinting of the base or finished paint. However, proposed changes in legislation would include the VOC contribution of the pigment dispersion that is added at the POS as well as depot tinting. Therefore, the selection of raw materials is an important criteria to the paint formulator in terms of the VOC contribution of the pigment dispersions to the finished coating or paint.

In order to minimize the VOC content of the finished tinted surface coating or paint, consideration must be given to any VOC that is contained in the pigment dispersion used to tint the paint base to produce the finished paint.

Solventborne colorants, or pigment dispersions, for tinting solvent-based coatings can have a VOC content that ranges from 300 g/L and higher. Historically, these VOC values have been commercially acceptable to manufacturers of finished paints into which the pigment dispersions were incorporated at the manufacturer's facility, or to manufacturers that marketed paint bases for custom tinting at the point of sale, e.g., at retail paint stores and the paint department of home center stores. However, as environmental awareness and concerns of consumers have grown, and governmental agencies have imposed stricter regulations regarding the release into the atmosphere of VOCs, the paint industry has sought means for reducing the VOC content of its products. It would therefore be desirable to provide pigment dispersion and systems containing a number of pigment dispersions of different colors that have a low or reduced VOC content for use by paint manufacturers in their own facilities, at third party tinting facilities, and for the retailers that provide custom tinting services at the point of sale, which would thereby reduce the overall VOC content of the finished paints containing the pigment dispersions.

The present invention is directed to the problem of a formulating solventborne pigment dispersion compositions having a reduced VOC content as compared to prior art pigment dispersions and providing pigment dispersions which can be used to tint solventborne paint bases having a variety of different chemistries.

The invention also addresses the problem of formulating a solventborne pigment dispersion of relatively low VOC content that has minimal adverse effects on the desirable physical properties of the paint bases to which it is added, including the finished paint's rheological properties and the properties of the cured paint film.

A further problem addressed by the present invention is providing a pigment dispersion that can be used to tint-solvent-based surface coatings to provide a finished surface coating that will have a reduced VOC content in relation to comparable available products in order to assist paint manufacturers and marketers to meet the increasingly strict regulations regarding VOC emissions into the atmosphere.

More specifically, a goal of the present invention is to provide solventborne pigment dispersion compositions having no more, and preferably less than 250 g/L of VOC.

SUMMARY

The above-identified problems are solved and other advantages are achieved by the pigment dispersions of the present invention that have a VOC content of 250 g/L, or less, which pigment dispersions comprise:
1. at least one organic pigment or at least one inorganic pigment, or mixtures thereof;
2. a solvent that 1s at least one methyl ester composition derived from a vegetable oil;
3. at least one solvent from solvent group Bin Table 1;
4. a high-solid content resin, or mixture of resins, containing at least 60 percent solids;
5. one or more surfactants that contain no alkyl phenol ethoxylate moieties or free volatile aromatic compounds; and
6. one or more rheological additives, as needed.

DETAILED DESCRIPTION

Methyl esters derived from vegetable oils may be used as the solvent in formulating solventborne pigment dispersions used in tinting solvent-based paints. Comprehensive testing is described below for soy methyl esters, canola methyl esters, palm methyl esters, and rapeseed methyl esters.

In the Tables which follow the abbreviations refer to the compounds indicated:
SME soy methyl ester
CME canola methyl ester
PME palm methyl ester
RME rapeseed methyl ester
PMA propylene glycol monomethyl ether acetate As will be understood by one of ordinary skill in the art, the precise formulation of the surfactants, as well as other products identified in this description, are generally proprietary to the manufacturer/supplier of the particular product. Further information regarding the commercial products identified in this description of the present invention can be readily obtained via the internet. For example, in addition to general characterizations of the nature of specific products sold by trade name that are provided by the manufacturer/supplier, a Material Data Safety Sheet, or MSDS, is legally required by law in most jurisdictions throughout the world. The MSDS includes information on the chemicals used in the formulation for the product. The descriptions used in this specification will be understood to be general and that the identification of specific products by trade name and supplier will enable one of ordinary skill in the art to practice the claimed invention.

As will be understood by one of ordinary skill in the art, solvents such as PMA have been used to adjust and maintain the viscosity of pigment dispersion formulations at a predetermined value, or within a range of values. The viscosity-adjusting solvent, or mixture of solvents, is generally present in the finished pigment dispersion in a lower weight percent of the total than the vegetable oil-derived methyl esters, and is referred to as a secondary solvent. Suitable solvents are identified in Group B in Table 1. This novel use of ethyl lactate as an alternative solvent is described in more detail below.

TABLE 1

Solvents

| | Type | Product Name | Supplier |
|---|---|---|---|
| Group A | Vegetable oil-derived methyl esters | Soy methyl esters | CFC, Inc. |
| | | Rapeseed oil methyl esters | G. C. Rutteman & Co. |
| | | Palm oil methyl esters | G. C. Rutteman & Co. |
| | | Canola oil methyl esters | Lake Erie Biofuels |
| Group B | Propylene glycol monomethyl ether acetate | PMA | Dow Chemical |
| | Ethyl lactate | Ethyl lactate | Westco Chemicals, Inc. |
| | A lactate ester based biosolvent replacement for PMA | ELSOL-PMAR | Vertec BioSolvents, Inc. |
| | Mineral spirits | Mineral Spirit 66 | CITGO Petroleum Cop. |
| | Tertiary butyl acetate | TBAc | LyondellBasell |

The results of the extensive testing described below indicate that the properties of the naturally-based methyl esters as a group are so similar that mixtures of two or more of the products can be used in formulating the pigment dispersions of the invention.

Also surprising is the finding that the vegetable oil-derived methyl esters can be used in the same proportions, or loadings, as the solvent that the respective vegetable oil methyl ester(s) replaced. This finding was based on extensive testing in representative formulations using both a yellow oxide inorganic pigment and a phthalo blue organic pigment in an epoxy base and a polyurethane (PU) base. Thus, the advantageous use and benefits of the pigment dispersions of the invention were substantiated by testing each vegetable oil-derived methyl ester composition in four different formulations.

Soy methyl esters, also known as methyl soylate, function as a solvent in the pigment dispersion composition. This product is a fatty acid alkyl ester and it is derived from soy bean oil containing a relatively low VOC content, e.g., less than 50 g/L, as determined by EPA Method 24. It is not known to have an adverse effect on the ozone layer, has a flash point greater than 360° F./182° C., and is a non-irritant to eyes and skin. It is produced from soy beans, which are a commodity agricultural product grown all over the world. As such, it is a renewable resource and one that is biodegradable. It is a mixture of $C_{16}$-$C_{18}$ methyl esters. A suitable product is available from CFC, Inc., of Des Plaines, Ill. 60018-1945, USA, doing business as Columbus Vegetable Oils, and is sold under the trade name EnviroSaver® Soybean Methyl Esters.

Canola oil methyl esters are available from Lake Erie Biofuels LLC of Erie, Pa., 16511 USA.

Rapeseed oil methyl esters and palm oil methyl esters are available from G.C. Rutteman & Co., Beursplein 37, 3011AA Rotterdam, The Netherlands.

Methyl esters of fatty acids are synthesized by trans-esterification reactions of vegetable oils and methanol in the presence of a catalyst. The glycerine tri-ester is replaced by monoesters of methanol and the fatty acid. Compositional information, i.e., chain lengths and number of (un)saturated bonds (0, 1, 2, or 3) for the methyl esters subjected to extensive testing that is described below is set forth in Table 1A.

TABLE 1A

| | C16:0 (%) | C18:0 (%) | C18:1 (%) | C18:2 (%) | C18:3 (%) |
|---|---|---|---|---|---|
| Rapeseed oil methyl ester (RME) | 2-6 | 4-6 | 52-65 | 18-25 | 10-11 |
| Soybean oil methyl ester (SME) | 10-12 | 3-5 | 18-26 | 49-57 | 6-9 |
| Palm oil methyl ester (PME) | 40-47 | 3-6 | 36-44 | 6-12 | — |
| Canola oil methyl ester (CME) | 3-5 | 1-3 | 55-65 | 18-22 | 6-12 |

Sources of these natural products are as follows:
RME feedstock—major crops from EU, China, and Canada;
SME feedstock—major crops from the US;
PME feedstock—major crops from India and Malaysia; and
Canola feedstock—major crops from Canada and United States.

Methyl and ethyl esters of vegetable oils are generally available in commercial quantities in various markets throughout the world. The oils are typically produced where the natural raw materials originate, e.g., palm oil in Southeast Asian countries. The demand for methyl and ester products has grown due to their increasing use as biofuels for automotive engines and heating boilers in place of petroleum-derived diesel and bunker fuels.

The desired esters are readily produced by mixing the vegetable oil with the alcohol, e.g., methanol and/or ethanol, and a catalyst; the mixture is distilled and the ester product can be recovered as a separate stream of high purity.

In addition to the four vegetable oil-derived methyl esters upon which extensive tests have been undertaken, with the results clearly establishing their utility, the class of vegetable oils that can be used in the practice of the invention includes coconut methyl esters, corn methyl esters, cottonseed methyl esters, olive methyl esters, peanut methyl esters, safflower methyl esters, sesame methyl esters and sunflower methyl esters. Commercial quantities of the methyl esters for use in the present invention can be purchased from suppliers on the international market, or the vegetable oil product(s) can be purchased as a raw material for local production of the methyl esters.

A suitable high solids acrylic resin that has been found to function well in the formulation of the invention is a proprietary resin in solution with 2-methoxy-1-methyl ethyl acetate and 2-methoxy propyl acetate sold under the trade name DEGALAN resin by Evonik Rohm GmbH of Darmstadt, Germany.

As noted above, it is preferred that the surfactant(s) used in the composition be constituted of 100% active material, that is, the surfactant is substantially free of any solvent(s) and/or carrier(s). Specifically, the surfactant should also be substantially free of, or contain no alkyl phenol ethoxylate moieties or free volatile aromatic compounds.

A suitable surfactant in the form of a copolymer with an acidic group in the form of a phosphated ester and phosphoric acid (residual) is sold commercially under the trademark DISPERBYK 111 by BKY USA Inc. of Wallingford, Conn. 06492 USA.

Another suitable surfactant that improves pigment dispersion and stability is a 40% active polymeric dispersant in MPA (2-methoxy-1-methylethyl acetate) sold under the trademark SOLSPERSE 38500 by Lubrizol Ltd. of Manchester M98ZS United Kingdom.

TABLE 2

| Surfactants | | |
|---|---|---|
| Type | Name | Supplier |
| Copolymer with acidic groups | Disperbyk 111 | BYK USA, Inc. |
| Solution of a phosphoric ester salt of a high molecular weight copolymer with pigment affinic groups (Phosphate esters) | Disperbyk 142 | |
| Solutions of high molecular weight block copolymers with pigment affinic groups | Disperbyk 167 | |
| Solutions high molecular weight block copolymers with pigment affinic groups | Disperbyk 182 | |
| Block-copolymer with pigment affinic groups - sphere-like molecular structure in contrast to conventional linear structures | Disperbyk 2155 | |
| Acrylic Block Copolymer - High molecular weight dispersing agent | EFKA4330 | BASF |
| Alkylammonium salt of a high molecular weight copolymer | Byk 9076 | BYK USA, Inc. |
| High molecular weight copolymer with pigment affinic groups | Byk 9077 | |
| Insoluble pigment complex. Acts as a pigment synergist. Provides a better adsorption of polymeric wetting and dispersing additives | Byk Synergist 2105 | |
| Pigmentary synergist agent | Solsperse 5000 | Lubrizol |
| Polymeric dispersant in aliphatic | Solsperse 13940 | |
| Polymeric dispersant in PGMA | Solsperse 38500 | |
| Surfactants, e.g. phosphate esters, alkylaryl sulfonates | Rhodafac RS-710 | Rhodia |

One or more rheological modifiers are added in order to develop the desired characteristics of the finished pigment dispersions in accordance with methods that are known to those of ordinary skill in the art. Suitable rheological modifiers for use in the pigment dispersions are identified in Table 3.

TABLE 3

| Rheological Additives | | |
|---|---|---|
| Type | Product Name | Supplier |
| Bentonite Clay | Claytone AF | Southern Clay |
| Bentonite Clay | Claytone AF | |
| Bentonite Clay | Claytone AF | |
| Bentonite Clay | Tixogel VP | |
| Bentonite Clay | Tixogel MP | |
| Bentonite Clay | Tixogel MP100 | |
| Bentonite Clay | Tixogel TE | |
| Bentonite Clay | Bentone 34 | Elementis Specialities |
| Hectorite Clay | Bentone 38 | |
| Bentonite Clay | Bentone SD1 | |
| Bentonite Clay | Bentone SD2 | |
| Hectorite Clay | Bentone SD3 | |
| Organic - Castor Oil Derivative | Thixcin ST | |
| Organic - Castor Oil Derivative | Thixcin R | |
| Hydrophobically modified fumed silica | Aerosil R972 | Evonik Degussa |
| Fumed Silica | Aerosil200 | |
| Hydrophobically modified fumed silica | Cab-0-Sil TS610 | Cabot Corp. |
| Fumed Silica | Cab-0-Sil M5 | |
| Hydrophobically modified fumed silica | HDKH15 | Wacker Chemie |
| Fumed Silica | HDKN20 | |

Colorant compositions in accordance with the present invention can be prepared using the organic and inorganic pigments selected from those listed below in Table 4.

TABLE 4

| Pigments | | |
|---|---|---|
| Pigment Type | Pigment Color | Color Index Number |
| Monoazo pigments | Pigment Orange | 36, 67, 74 |
| | Pigment Yellow | 74, 97, 120, 151, 154, 175 |
| Disazo pigments | Pigment Orange | 34 |
| | Pigment Yellow | 83, 155 |
| Disazocondensation pigments | Pigment Yellow | 128 |
| | Pigment Red | 166, 214, 242, 262 |
| Anthanthron pigments | Pigment Red | 168 |

TABLE 4-continued

Pigments

| Pigment Type | Pigment Color | Color Index Number |
|---|---|---|
| Quinacridone pigments | Pigment Red | 122, 202, 206, 209 |
|  | Violet | 19 |
| Quindophthalon pigments | Pigment Yellow | 138 |
| Diketopyrollopyrrol pigments | Orange | 71, 73, 81 |
|  | Pigment Red | 254, 255, 264, 270, 272 |
| Dioxazinpigments | Pigment violet | 23, 37 |
| Indanthron pigments | Pigment Blue | 60, 64 |
| Isoindoline pigments | Pigment Orange | 61, 64 |
|  | Pigment Red | 260 |
|  | Pigment Yellow | 139, 185 |
| Isoindolinone pigments | Pigment Yellow | 109, 110, 173 |
| Perinone pigments | Pigment Orange | 43 |
|  | Pigment Red | 194 |
| Perylene pigments | Pigment Black | 31, 32 |
|  | Pigment Red | 123, 149, 178, 179, 190, 224 |
|  | Violet | 29 |
| Phthalocyanine pigments | Pigment Blue | 15, 15:1, 15:2, 15:3, 15:4, 15:6, 16 |
|  | Pigment Green | 7, 36 |
| Pyranthron pigments | Pigment Orange | 51 |
|  | Pigment Red | 216 |
| Pyrazoloquindozolone pigments | Pigment Orange | 67 |
|  | Pigment Red | 251 |
| Thioindigo pigments | Pigment Red | 88, 181 |
|  | Pigment Violet | 38 |
| White pigments opaque | Pigment White ($TiO_2$) | 6 |
|  | Zinc oxide |  |
|  | Zinc sulfite |  |
|  | Lithopone |  |
| White pigments non-opaque | Calcium carbonate |  |
|  | Barium Sulfate |  |
|  | Talcum |  |
|  | China Clay |  |
|  | Silica |  |
|  | Mica |  |
| Black pigments | Pigment Black (aniline black) | 1 |
|  | Carbon Black | 7 |
|  | Iron Oxide Black | 11 |
|  | Iron Copper Manganese | 26 |
|  | Iron Cobalt Chromium | 27 |
|  | Chromium Iron Oxide | 29 |
|  | Iron Chromium Manganese | 30 |
|  | Perylene Black | 32 |
|  | Iron Manganese | 33 |
| Inorganic chromatic pigments | Pigment Blue (Cobalt Blue) | 28 |
|  | Pigment Blue (Cobalt Blue) | 36 |
|  | Pigment Green (Cobalt Green) | 50 |
|  | Pigment (Nickel Titanate Yellow) | 53 |
|  | Brown (Chrome Titanate Yellow) | 24 |
|  | Yellow (Zinc Tin Titanate Yellow) | 216 |
|  | Pigment Brown (Iron oxide brown) | 6, 7 |
|  | Pigment Green (Chrome Oxide Green) | 17 |
|  | Pigment Yellow (Iron Oxide Yellow) | 42 |
|  | Pigment Red (Iron Oxide Red) | 101 |
|  | Pigment Blue (Ultramarine Blue) | 29 |
|  | Pigment Yellow 184 (Bismuth Vanadate) | 184 |

A representative palette of pigment dispersions for producing color systems containing over two-thousand individual tints and hues can be prepared from the pigments identified in Table 5. As will be understood by those of ordinary skill in the art, the number of pigment dispersions required to support a given paint manufacturer's color system can be fewer or greater than the number of pigments included in this table.

TABLE 5

|   | Pigment | Color Index |
|---|---|---|
| 1 | Carbon Black | PBk7 |
| 2 | Phthalo Blue | PB15:3 |
| 3 | Phthalo Green | PG7 |
| 4 | Organic Yellow | PY175 |
| 5 | Medium Yellow | PY151 + PY83 |
| 6 | Carbazole Violet | PV23 |
| 7 | Quinacridone Violet | PV19 |
| 8 | Quinacridone Red | PV19 |
| 9 | Bismuth Vanadate | PY184 |
| 10 | Yellow Oxide | PY42 |
| 11 | Red Oxide | PY101 |
| 12 | Burnt Umber | PBr7 |
| 13 | DPPRed | PR254 |
| 14 | Orange | PO74 |
| 15 | White | PW6 |
| 16 | Orange | PO74 |

Suitable pigment dispersion formulations for preparing the pigment dispersions of the invention, including those for use in dispensing machines, can contain ingredients in the ranges indicated in Table 6, all in parts by weight of the finished product.

TABLE 6

| Ingredient | Parts by Weight |
|---|---|
| High solids grinding resin | 9.0-40.0 |
| One or more surfactants from Table 2 (as supplied) | 5.0-22.0 |
| Methyl esters of solvent group A | 5.0-40 |
| Solvent from group B | 4.5-15.0 |
| Pigment | 10-60 |
| Rheological additives | 0.1-2.0 |

As will be understood by those of ordinary skill in the art, the same type of functional components, e.g., surfactants, supplied by different commercial manufacturers represent proprietary formulations containing different amounts of carriers and other ingredients along with the active compound(s). For this reason, the following formulations refer to the functional components "as supplied," and the parts by weight, or percent, of specific commercial products to be used within the range must be determined based on experience and/or routine tests.

The three pigment dispersion compositions prepared using the methyl esters in place of PMA as the solvent and in accordance with the formulations described above were added to four commercial paint bases of the alkyd, polyurethane, acrylic urethane and epoxy types.

Comparable paint compositions were prepared using commercially available pigment dispersions of the prior art having a VOC content in the range above 300 g/L.

The following series of standardized tests were performed: blocking, cross-cut adhesion, pendulum harness, impact, viscosity, compatibility, weight/gal., VOC, flash point and oven stability.

The standardized ASTM test protocols that were used in testing the properties of the paints are set forth in Table 7.

TABLE 7

| Rub resistance | ASTMD5402 |
|---|---|
| Drying time | ASTM D5895 |
| Freeze/thaw stability | ASTMD2243 |
| Gloss | ASTMD2427 |
| Hardness | ASTMD4366 |
| Adhesion | ASTMD3359 |
| Blocking coat to coat | ASTMD4946 |
| Compatibility | ASTMD5326 |
| Sagging | ASTMD4400 |

In substantially all instances, the test results on the paint formulations prepared using the pigment dispersions of the present invention were at least comparable to the prior art pigment dispersion formulations and, in some instances, produced superior test results.

In the practice method of the invention on a commercial scale, the pigment dispersion is prepared in accordance with the mixing and grinding processes that are known to those of ordinary skill in the art.

Use of Ethyl Lactate as Solvent

It has also been found that ethyl lactate can be used as an alternative solvent for use in place of propylene glycol monomethyl ether acetate (PMA) which is typically employed in solventborne colorant compositions at a loading, or concentration of about 5 weight percent. Ethyl lactate is completely biodegradable and is approved by the FDA, e.g., for preparing flavorings.

The results of the tests discussed above establish that soy methyl esters having a very low VOC content can be used to formulate solventborne pigment dispersions based on both organic and inorganic pigments. Using the soy methyl esters as a standard or baseline product that possesses characteristics that make it a desirable solvent for use in solventborne pigment dispersions, a series of test protocols were undertaken to compare the performance characteristics of canola methyl esters, palm methyl esters and rapeseed methyl esters with those of the soy methyl esters.

Comparative Test Protocols for Methyl Esters of Canola, Palm and Rapeseed Vegetable Oils In order to demonstrate the utility of the methyl esters of the canola, palm and rapeseed vegetable oils, and their substantially equivalent performance as replacements for the solvent in solventborne pigment dispersions for tinting solvent-based coatings, a comparative test protocol was established. A yellow oxide pigment was selected as representative of the inorganic pigment-based examples and a phthalo blue for the organic pigment-based example. Laboratory operating formulas were used, consistency across all tests was emphasized, which included the use of the same lot of materials throughout and processing all materials in a Scandex® milling and mixing apparatus; the resulting products were recovered using a brass cone filter having a fine mesh.

The method of mixing and grinding pigment dispersions formulated in accordance with the present invention generally follows procedures that are known in the art. The preparation of a titanium dioxide (TiO2) pigment dispersion of the present invention will be described.

Example—Preparation of Solventborne Titanium Dioxide Pigment Dispersion

The following method of preparing the pigment dispersion is representative and should not be construed as limiting, since other methods known to those of ordinary skill in the art can also be applied, and using different equipment and standards.

A. The preparation of a batch is initiated by adding the resin specified in the formula to the vessel.
B. The liquid surfactants, e.g., Disperbyk 111 and Rhodafac RS 710, are added to the resin in the vessel.
C. The propylene glycol monomethyl ester acetate (PMA) and soy methyl ester solvents are added to the surfactants and resin.
D. The batch is mixed for at least 15 minutes in order to thoroughly blend all of the liquid raw materials.
E. The pigment is then added slowly to the batch while mixing to minimize dust and the formation of large agglomerates.
F. The batch is then premixed at a rate of 1000-3000 rpms for 30 minutes until the pigment is completely wet out and there are no large agglomerates of pigment.
G. The premixed material is passed through a Premier mill containing a milling aid, such as 0.8-1.0 mm Zirconox® as required until a grind of 7.5+ Hegman is achieved. The temperature of the mixture should be maintained below 120° F. to avoid any adverse color-changing effects that higher temperatures can have on certain types of pigments, and thereby on the furnished pigment dispersion.
H. The batch is evaluated for grind, viscosity and color strength before adding the remaining ingredients of the specific formula.
I. The batch is adjusted for strength with the addition of solvent (PMA and soy methyl esters) or resin, or a blend of both.

Formulas typically used for commercially acceptable yellow oxide inorganic and pthalo blue organic pigments were used at the same concentrations for the vegetable oil-derived methyl esters with only the solvent being changed in the substitution. No adverse visible rheological problems were observed. The formulas for each are set forth in Tables 8 and 9.

TABLE 8

| Grinding Resin | 10-20 | 10-20 | 10-20 | 10-20 |
|---|---|---|---|---|
| Surfactants | 5-10 | 5-10 | 5-10 | 5-10 |

TABLE 8-continued

| PMA | 5-10 | 5-10 | 5-10 | 5-10 |
|---|---|---|---|---|
| SME | 5-20 | | | |
| CME | | 5-20 | | |
| PME | | | 5-20 | |
| RME | | | | 5-20 |
| Yellow Oxide (PY42) | 30-60 | 30-60 | 30-60 | 30-60 |
| Rheological Additive | 0.1-1.0 | 0.1-1.0 | 0.1-1.0 | 0.1-1.0 |
| Total | 100.00 | 100.00 | 100.00 | 100.00 |

TABLE 9

| Grinding Resin | 20-40 | 20-40 | 20-40 | 20-40 |
|---|---|---|---|---|
| Surfactants | 5-20 | 5-20 | 5-20 | 5-20 |
| PMA | 5-15 | 5-15 | 5-15 | 5-15 |
| SME | 10-30 | | | |
| CME | | 10-30 | | |
| PME | | | 10-30 | |
| RME | | | | 10-30 |
| Phthalo Blue (PB15:3) | 10-30 | 10-30 | 10-30 | 10-30 |
| Total | 100.00 | 100.00 | 100.00 | 100.00 |

A comparison of the physical properties of the vegetable-oil-derived methyl esters are set forth in Table 10.

TABLE 10

| | Yellow Oxide (PY42) | | | Phthalo Blue (PB15:3) | | |
|---|---|---|---|---|---|---|
| Trial | Viscosity (cP) | Density (lbs/gal) | Grind (H) | Viscosity (cP) | Density (lbs/gal) | Grind (H) |
| SME | 349.7 | 13.946 | 7.5 | 153.8 | 8.937 | 7.5 |
| CME | 358.1 | 13.926 | 7.5 | 166.9 | 8.941 | 7.5 |
| PME | 375.9 | 13.919 | 7.5 | 155.6 | 8.907 | 7.5 |
| RME | 365.6 | 13.914 | 7.5 | 158.4 | 8.921 | 7.5 |

The results of the comparative physical property evaluation on the two formulations of the present invention as set forth in Table 10 showed comparable properties and showed no change from acceptable standard commercial pigment dispersions.

TABLE 11

| Colorant | Paint Base | Tint | SME (Baseline) | | CME | | ME | | RME | |
|---|---|---|---|---|---|---|---|---|---|---|
| | | | Strength % | Rub-up | Strength % | Rub-up | Strength % | Rub-up | Strength % | Rub-up |
| PY42 | 2KEpoxy High Gloss Enamel | Deep | 100 | Ok | 100.1 | ok | 99.9 | ok | 99.5 | Ok |
| PY42 | 2K Aliphatic PU | Deep | 100 | Ok | 100.4 | ok | 100 | ok | 100.3 | Ok |
| PB15:3 | 2KEpoxy High Gloss Enamel | Deep | 100 | Ok | 100.8 | ok | 99.3 | ok | 100.6 | Ok |
| PB15:3 | 2K Aliphatic PU | Deep | 100 | Ok | 100.5 | ok | 99.3 | ok | 99.9 | Ok |

As shown by the values reported in Table 11, the sag results for all four formulations of vegetable-oil based methyl esters in both yellow and blue dispersions were below those of the bases alone.

TABLE 12

| Colorant | Paint Base | Tint | Base Only | SME | CME | PME | RME |
|---|---|---|---|---|---|---|---|
| PY42 | 2K Epoxy High Gloss Enamel | Deep | 20 mils | 18 mils | 16 mils | 16 mils | 14 mils |
| PY42 | 2K Aliphatic PU | Deep | 14 mils | 8 mils | 6 mils | 6 | 8 mils |
| PB15:3 | 2K Epoxy High Gloss Enamel | Deep | 20 mils | 16 mils | 16 mils | 16 mils | 18 mils |
| PB15:3 | 2K Aliphatic PU | Deep | 14 mils | 12 mils | 12 mils | 12 mils | 12 mils |

As shown by the data reported in Table 12, the leveling values for both colors in the 2-component epoxy enamel formulations were comparable to the base alone for all of the vegetable-oil-based methyl esters. The values for the aliphatic polyurethane were lower.

TABLE 13

| Colorant | Paint Base | Tint | Base Only | SME | CME | PME | RME |
|---|---|---|---|---|---|---|---|
| PY42 | 2K Epoxy High Gloss Enamel | Deep | 80 mils | 80 mils | 80 mils | 80 mils | 80 mils |
| PY42 | 2K Aliphatic PU | Deep | 160 mils | 40 mils | 40 mils | 40 mils | 40 mils |
| PB15:3 | 2K Epoxy High Gloss Enamel | Deep | 80 mils | 80 mils | 80 mils | 80 mils | 80 mils |
| PB15:3 | 2K Aliphatic PU | Deep | 160 mils | 80 mils | 80 mils | 80 mils | 80 mils |

As shown by the results reported in Table 13, the 60° gloss as measured by this test was comparable, or improved, with the use of the vegetable oil-based methyl esters.

TABLE 14

| Colorant | Paint Base | Tint | Base Only | SME | CME | PME | RME |
|---|---|---|---|---|---|---|---|
| PY42 | 2K Epoxy High Gloss Enamel | Deep | 97.6 | 97.0 | 98.3 | 97.3 | 97.9 |
| PY42 | 2K Aliphatic PU | Deep | 75.6 | 81.7 | 80.5 | 82.0 | 75.8 |
| PB15:3 | 2K Epoxy High Gloss Enamel | Deep | 97.6 | 97.0 | 97.1 | 96.9 | 96.3 |
| PB15:3 | 2K Aliphatic PU | Deep | 75.6 | 82.3 | 84.8 | 81.8 | 81.6 |

In each of the seven-day Peroz hardness (seconds) tests reported in Tables 14 and 15, 8 ounces of the respective yellow and blue formulations were added to the bases. The observed hardness values of the formulations containing the four methyl esters in the epoxy enamels was somewhat lower than the base; a significant lowering of hardness for both colors of the aliphatic polyurethane was noted with the methyl ester.

TABLE 15

| Yellow Oxide Colorant | 1 | 2 | 3 | Average |
|---|---|---|---|---|
| 2K Epoxy High Gloss Enamel | | | | |
| Base Only | 136 | 140 | 137 | 137.67 |
| SME | 126 | 128 | 127 | 127.00 |
| CME | 129 | 133 | 131 | 131.00 |
| PME | 127 | 127 | 127 | 127.00 |
| RME | 130 | 127 | 127 | 128.00 |
| 2K Aliphatic PU | | | | |
| Base Only | 81 | 81 | 81 | 81.00 |
| SME | 57 | 59 | 58 | 58.00 |
| CME | 58 | 58 | 58 | 58.00 |
| PME | 55 | 57 | 56 | 56.00 |
| RME | 56 | 56 | 56 | 56.00 |

TABLE 16

| Phthalo Blue Colorant | 1 | 2 | 3 | Average |
|---|---|---|---|---|
| 2K Epoxy High Gloss Enamel | | | | |
| Base Only | 136 | 140 | 137 | 137.67 |
| SME | 120 | 121 | 121 | 120.67 |
| CME | 123 | 121 | 122 | 122.00 |
| PME | 125 | 121 | 124 | 123.33 |
| RME | 121 | 122 | 119 | 120.67 |
| 2K Aliphatic PU | | | | |
| Base Only | 81 | 81 | 81 | 81.00 |
| SME | 55 | 56 | 57 | 56.00 |
| CME | 56 | 56 | 56 | 56.00 |
| PME | 56 | 56 | 57 | 56.33 |
| RME | 56 | 55 | 56 | 55.67 |

The evaluation of vegetable oil-derived methyl esters in the low VOC solventborne pigment dispersions confirmed that this class of compounds can be readily substituted for the prior art solvent(s) of higher VOC content commonly used in the prior art formulations. All tests for physical properties and compatibility showed little to no variation, regardless of which methyl ester was used or in which pigment dispersion they were used, whether organic or inorganic pigment-based. As shown by Table 16, the VOC levels were comparable to each other since the values yielded a calculated standard deviation of +1-5 g/L, which is well within testing tolerances for VOC measurements.

TABLE 17

| Yellow Oxide Colorant | | Phthalo Blue Colorant | |
|---|---|---|---|
| Methyl Ester | VOC (giL) | Methyl Ester | VOC (giL) |
| SME | 184.35 | SME | 220.49 |
| CME | 179.17 | CME | 227.02 |
| PME | 188.67 | PME | 225.83 |
| RME | 179.21 | RME | 225.21 |

Other than the results for the sag resistance of the inorganic pigment dispersion with rapeseed methyl ester (RME) in the epoxy base, testing of all film properties in epoxy and polyurethane bases also resulted in little to no variation as well, regardless of methyl ester type and pigment dispersion. The results support the conclusion that any vegetable oil-derived methyl ester can be utilized in low VOC solvent borne industrial pigment dispersion formulations without significantly compromising any physical specifications established for the pigment dispersion line or any established film properties that the pigment dispersion line imparts to epoxy and PU bases.

Ethyl Lactate Evaluation

As noted above, the use of a high-solids resin, or mixture of resins, is preferred; however, the reduced percentage, or weight, of solvent in the resin solution increases the viscosity of the pigment dispersion mixture. In order to reduce and maintain the required viscosity, a separate solvent must be added. The solvent customarily employed to control and adjust the viscosity in such cases is PMA, a petroleum-derived VOC.

Surprisingly, it has been found that ethyl lactate (EL) can be substituted for all or a portion of the PMA used to adjust the viscosity of the pigment dispersion. As will be described in detail below, the physical properties and characteristics of the EL are comparable to those of PMA and it can be used in place of PMA at the same loadings.

The starting materials for producing EL, lactic acid and ethyl alcohol, or ethanol, can be naturally derived from renewable resources. The EL product also has the desirable attribute of being biodegradable. From a safety standpoint, EL has a higher flash point and a lower vapor pressure than the PMA which it replaces.

As evidenced by the results of comparative tests, the direct substitution of EL for PMA can be advantageously undertaken in the pigment dispersion formulations of the present invention without significant diminution of the performance characteristics relating to application of the finished tinted paints and the cured coating.

The phthalo blue trials used the formula in Table 8 and the yellow oxide trials used the formula in Table 7. All raw materials were used in the same concentrations as the original formula with only the PMA solvent being changed, but also utilized at the same loading. A matrix of the formulas is provided below in Tables 18 & 19. All trials processed equally well and no visual rheological issues were observed.

The ethyl lactate evaluation results for each test performed are set forth in the Tables that follow, along with a description of the tests and results.

A comparison of the relevant physical properties of PMA and ethyl lactate (EL) is set forth in Table 17.

TABLE 18

| Physical Properties | PMA | Ethyl Lactate |
|---|---|---|
| Molecular Weight (g/mol) | 132.2 | 118.13 |
| Boiling Point @ 1.01 bar (° F.) | 295 | 309 |
| Flash Point, Closed Cup (° F.) | 108 | 145 |
| Vapor Pressure@ 20° C. (mmHg) | 2.8 | 1.7 |
| Specific Gravity @ 25° C. | 0.966 | 1.034 |
| Volatiles by Volume (%) | 100 | 100 |

TABLE 19

| | | |
|---|---|---|
| Grinding Resin | 10-20 | 10-20 |
| Surfactants | 5-10 | 5-10 |
| PMA | 5-10 | |
| Ethyl Lactate | | 5-10 |
| SME | 5-20 | 5-20 |
| Yellow Oxide (PY42) | 30-60 | 30-60 |
| Rheological Additive | 0.1-1.0 | 0.1-1.0 |
| Total | 100.00 | 100.00 |

TABLE 20

| | | |
|---|---|---|
| Grinding Resin | 20-40 | 20-40 |
| Surfactants | 5-20 | 5-20 |
| PMA | 5-15 | |
| Ethyl Lactate | | 5-15 |
| SME | 5-20 | 5-20 |
| Phthalo Blue (PB15:3) | 30-60 | 30-60 |
| Rheological Additive | 0.1-1.0 | 0.1-1.0 |
| Total | 100.00 | 100.00 |

Relevant physical properties of the formulations for the two pigment dispersions are set forth in Table 21.

TABLE 21

| | Yellow Oxide (PY42) | | | Phthalo Blue (PB15:3) | | |
|---|---|---|---|---|---|---|
| Trial | Viscosity (cP) | Density (lbs/gal) | Grind (H) | Viscosity (cP) | Density (lbs/gal) | Grind (H) |
| PMA | 349.7 | 13.946 | 7.5 | 153.8 | 8.937 | 7.5 |
| EL | 384.4 | 13.997 | 7.5 | 159.4 | 8.963 | 7.5 |

The effects on color strength and compatibility on the yellow oxide and phthalo blue pigment dispersions are shown in Table 22.

TABLE 22

| | | | SME (Baseline) | | EL | |
|---|---|---|---|---|---|---|
| Colorant | Paint Base | Tint | % Strength | Rub-up | % Strength | Rub-up |
| PY42 | 2K Epoxy High Gloss Enamel | Deep | 100 | ok | 99.7 | ok |
| PY42 | 2K Aliphatic PU | Deep | 100 | ok | 99.5 | ok |
| PB15:3 | 2K Epoxy High Gloss Enamel | Deep | 100 | ok | 100.7 | ok |
| PB15:3 | 2K Aliphatic PU | Deep | 100 | ok | 100.6 | ok |

The results of the cross-cut adhesion tests for the two colors added at 8 ounces are shown by Table 22 to be comparable for the EL and SME.

TABLE 23

| Colorant | Paint Base | Tint | SME | EL |
|---|---|---|---|---|
| PY42 | 2K Epoxy High Gloss Enamel | Deep | 5B | 5B |
| PY42 | 2K Aliphatic PU | Deep | 5B | 5B |
| PB15:3 | 2K Epoxy High Gloss Enamel | Deep | 5B | 5B |
| PB15:3 | 2K Aliphatic PU | Deep | 5B | 5B |

The results of the sag resistance tests with 8 ounces added of the respective yellow and blue pigment dispersions are shown in Table 24, which in general are somewhat lower than the base alone.

TABLE 24

| Colorant | Paint Base | Tint | Base Only | SME | EL |
|---|---|---|---|---|---|
| PY42 | 2K Epoxy High Gloss Enamel | Deep | 20 mils | 18 mils | 14 mils |
| PY42 | 2K Aliphatic PU | Deep | 14 mils | 8 mils | 8 mils |
| PB15:3 | 2K Epoxy High Gloss Enamel | Deep | 20 mils | 16 mils | 18 mils |
| PB15:3 | 2K Aliphatic PU | Deep | 14 mils | 12 mils | 12 mils |

The results of the leveling tests with addition of 8 ounces are shown compared to the base alone in Table 25.

TABLE 25

| Colorant | Paint Base | Tint | Base Only | SME | EL |
|---|---|---|---|---|---|
| PY42 | 2K Epoxy High Gloss Enamel | Deep | 80 mils | 80 mils | 80 mils |
| PY42 | 2K Aliphatic PU | Deep | 160 mils | 40 mils | 40 mils |
| PB15:3 | 2K Epoxy High Gloss Enamel | Deep | 80 mils | 80 mils | 80 mils |
| PB15:3 | 2K Aliphatic PU | Deep | 160 mils | 80 mils | 80 mils |

The results of the 60° gloss evaluation in Table 25 with 8 ounces added to each base show improved gloss over the bass alone for the ethyl lactate formulation.

TABLE 26

| Colorant | Paint Base | Tint | Base Only | SME | EL |
|---|---|---|---|---|---|
| PY42 | 2K Epoxy High Gloss Enamel | Deep | 97.6 | 97.0 | 98.3 |
| PY42 | 2K Aliphatic PU | Deep | 75.6 | 81.7 | 76.7 |
| PB15:3 | 2K Epoxy High Gloss Enamel | Deep | 97.6 | 97.0 | 96.0 |
| PB15:3 | 2K Aliphatic PU | Deep | 75.6 | 82.3 | 83.6 |

In each of the seven-day Peroz hardness (seconds) tests reported in Tables 26 and 27, 8 ounces of the respective yellow oxide and phthalo blue formulations were added to the bases. The hardness was somewhat lower with use of the SME and EL in the aliphatic polyurethane base.

TABLE 27

| Yellow Oxide Colorant | 1 | 2 | 3 | Average |
|---|---|---|---|---|
| | 2K Epoxy High Gloss Enamel | | | |
| Base Only | 136 | 140 | 137 | 137.67 |
| SME | 126 | 128 | 127 | 127.00 |
| EL | 127 | 129 | 128 | 128.00 |

TABLE 27-continued

| Yellow Oxide Colorant | 1 | 2 | 3 | Average |
|---|---|---|---|---|
| | 2K Aliphatic PU | | | |
| Base Only | 81 | 81 | 81 | 81.00 |
| SME | 57 | 59 | 58 | 58.00 |
| EL | 58 | 54 | 55 | 55.67 |

TABLE 28

| Phthalo Blue Colorant | 1 | 2 | 3 | Average |
|---|---|---|---|---|
| | 2K Epoxy High Gloss Enamel | | | |
| Base Only | 136 | 140 | 137 | 137.67 |
| SME | 120 | 121 | 121 | 120.67 |
| EL | 123 | 122 | 123 | 122.67 |
| | 2K Aliphatic PU | | | |
| Base Only | 81 | 81 | 81 | 81.00 |
| SME | 55 | 56 | 57 | 56.00 |
| EL | 56 | 56 | 56 | 56.00 |

The VOC content for SME and EL in the respective pigment dispersions are shown in Table 28, all being well below the value of 250 g/L.

TABLE 29

| Yellow Oxide Colorant | | Phthalo Blue Colorant | |
|---|---|---|---|
| Solvent | VOC (g/L) | Methyl Ester | VOC (g/L) |
| SME | 184.35 | SME | 220.49 |
| EL | 189.77 | CME | 226.39 |

While various embodiments of the invention have been described and illustrated by example, numerous other variations, changes and substitutions will be apparent to those of ordinary skill in the art based on this description and the scope of protection for the invention is to be determined by the claims that follow.

The invention claimed is:

1. A solventborne pigment dispersion having a volatile organic chemical (VOC) content that is less than 250 g/L for tinting solvent-based surface coatings, the pigment dispersion comprising:
    a vegetable oil-derived solvent component that is a mixture of methyl esters of one or more vegetable oils;
    a high solids content resin, or mixture of resins, containing at least 60 percent solids and present in amounts ranging from 9.0 to 40.0 parts by weight of the total solventborne pigment dispersion;
    one or more surfactants that contain no alkyl phenol ethoxylate moieties or free aromatic compounds and present in amounts from 5.0 to 22.0 parts by weight of the total solventborne pigment dispersion;
    at least one organic pigment or at least one inorganic pigment, or mixtures thereof;
    at least one alternative viscosity-controlling solvent in amounts ranging from 4.5 to 15.0 parts by weight of the total solventborne pigment dispersion, wherein the viscosity controlling solvent reduces and maintains the viscosity of the solventborne pigment dispersion at values ranging from about 153 cP to about 375 cP.

2. The pigment dispersion of claim 1 wherein the vegetable-oil derived solvent component includes from 5 to 40 percent by weight of the vegetable oil-derived methyl esters.

3. The pigment dispersion of claim 1 wherein the vegetable oil-derived solvent component is selected from soy methyl esters, canola methyl esters, palm methyl esters and rapeseed methyl esters.

4. The pigment dispersion of claim 3 wherein the vegetable oil-derived solvent component is soy methyl esters.

5. The pigment dispersion of claim 1 wherein the vegetable oil-derived solvent component is a blend of at least two different vegetable oil methyl esters.

6. The pigment dispersion of claim 1 wherein the alternative viscosity-controlling solvent is selected from the group consisting of propylene glycol monomethyl ether acetate (PMA), ethyl lactate, a lactate ester-based biosolvent, mineral spirits, tertiary butyl acetate, and combinations thereof.

7. The pigment dispersion of claim 6 wherein the alternative solvent is ethyl lactate.

8. The solventborne pigment dispersion of claim 1 wherein the pigment dispersion includes at least two different pigments.

9. The pigment dispersion of claim 1 further comprising at least one rheological modifier.

10. A finished solvent-based paint that includes a solventborne pigment dispersion formulated in accordance with claim 1.

11. The finished solvent-based paint of claim 10 that includes ethyl lactate and one or more methyl esters derived from the group of vegetable oils consisting of soybean oil, palm oil, canola oil and rapeseed oil, and mixtures thereof.

\* \* \* \* \*